(12) United States Patent
Kraft

(10) Patent No.: US 9,971,054 B2
(45) Date of Patent: May 15, 2018

(54) SYSTEM AND METHOD TO DETERMINE COMMUNICATION LINE PROPAGATION DELAY

(71) Applicant: Kersten Kraft, Celle (DE)

(72) Inventor: Kersten Kraft, Celle (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days. days.

(21) Appl. No.: 15/168,746

(22) Filed: May 31, 2016

(65) Prior Publication Data

US 2017/0343694 A1 Nov. 30, 2017

(51) Int. Cl.
| | | |
|---|---|---|
| G01V 3/00 | (2006.01) | |
| G01V 3/10 | (2006.01) | |
| G01V 3/08 | (2006.01) | |

(52) U.S. Cl.
CPC . *G01V 3/10* (2013.01); *G01V 3/08* (2013.01)

(58) Field of Classification Search
CPC ... G01V 3/28; G01V 3/38; G01V 3/18; G01V 3/20; G01V 3/22; G01V 3/24; G01V 3/26; G01V 3/30; G01V 3/10; G01V 3/265; G01V 3/02; G01V 3/04; G01V 3/06; G01V 3/104; E21B 47/026; E21B 47/122; E21B 47/0905; E21B 47/09; E21B 47/011; E21B 47/12; E21B 47/101; E21B 47/102; G01N 27/223; G01N 33/246; G01R 27/18; G01R 27/20
USPC ........ 324/324–375; 340/853.1–853.9, 854.1, 340/855.1–855.9, 856.1–856.4
See application file for complete search history.

(56) References Cited

U.S. PATENT DOCUMENTS

| | | | |
|---|---|---|---|
| 4,964,085 A | * | 10/1990 | Coope .................. E21B 47/082 324/338 |
| 5,641,016 A | | 6/1997 | Isaji et al. |
| 6,002,640 A | | 12/1999 | Harmon |

(Continued)

FOREIGN PATENT DOCUMENTS

| | | |
|---|---|---|
| WO | 2004074633 A1 | 9/2004 |
| WO | 2013039631 A2 | 3/2013 |

OTHER PUBLICATIONS

Zhang, et al. "Propagation Delay Measurement and Compensation for Sampled Value Synchronization in a Smart Substation", CSEE Journal of Power and Energy Systems, vol. 3, No. 2, Jun. 2017, 7 pages.

*Primary Examiner* — Thang Le
(74) *Attorney, Agent, or Firm* — Cantor Colburn LLP

(57) ABSTRACT

An apparatus for measuring resistivity in a borehole includes first and second modules configured to be conveyed through the borehole and a transmitter connected to the first module, the transmitter transmitting a transmitter signal that causes a field signal to be created in a formation surrounding the borehole. The apparatus also includes a receiver connected to the second module configured to sense the field signal, a reflection generator and a delay determination circuit that includes a pulse generator and a timer. The apparatus also includes a communication link coupling the delay determination circuit and the reflection generator. The delay determination circuit causes a first pulse to be transmitted to the reflection generator and determines an indication that is related to the time until a reflection is received back from the reflection generator.

20 Claims, 3 Drawing Sheets

(56) References Cited

U.S. PATENT DOCUMENTS

| | | | |
|---|---|---|---|
| 6,088,294 A * | 7/2000 | Leggett | E21B 44/00 175/45 |
| 6,114,857 A * | 9/2000 | Kohl | E21B 41/02 204/404 |
| 6,424,595 B1 | 7/2002 | Chenin | |
| 6,556,014 B1 * | 4/2003 | Kong | G01V 3/30 175/50 |
| 6,657,443 B2 | 12/2003 | Anderson | |
| 6,819,260 B2 | 11/2004 | Gardner et al. | |
| 7,061,932 B2 | 6/2006 | Gardner et al. | |
| 7,453,265 B2 * | 11/2008 | Johnstad | E21B 47/042 324/324 |
| 7,565,936 B2 | 7/2009 | Zhang et al. | |
| 7,686,099 B2 | 3/2010 | Rodney | |
| 8,181,057 B2 | 5/2012 | Nichols et al. | |
| 8,528,636 B2 | 9/2013 | Brooks | |
| 8,553,492 B2 | 10/2013 | Kimura et al. | |
| 8,749,400 B2 | 6/2014 | Robbins | |
| 8,866,633 B2 | 10/2014 | Montgomery et al. | |
| 9,562,987 B2 * | 2/2017 | Guner | G01V 3/30 |
| 2004/0090234 A1 * | 5/2004 | Macune | G01V 3/30 324/337 |
| 2006/0180349 A1 | 8/2006 | Dashevskiy | |
| 2007/0040557 A1 * | 2/2007 | Johnstad | E21B 47/042 324/324 |
| 2013/0021166 A1 | 1/2013 | Shah et al. | |
| 2014/0169129 A1 | 6/2014 | Orban | |
| 2014/0192621 A1 | 7/2014 | Ram et al. | |
| 2014/0354446 A1 | 12/2014 | Nakayama et al. | |
| 2015/0285945 A1 * | 10/2015 | Kamal | G01V 11/00 702/13 |

\* cited by examiner

SYSTEM AND METHOD TO DETERMINE COMMUNICATION LINE PROPAGATION DELAY

BACKGROUND

1. Field of the Invention

The present invention generally relates to drilling and, in particular, to determining a propagation delay in a resistivity measurement system in a drill system.

2. Description of the Related Art

Boreholes are drilled deep into the earth for many applications such as carbon dioxide sequestration, geothermal production, and hydrocarbon exploration and production. In all of the applications, the boreholes are drilled such that they pass through or allow access to a material (e.g., a gas or fluid) contained in a formation located below the earth's surface. Many different types of tools and instruments may be disposed in the boreholes to perform various tasks and measurements. One type of measurement that is typically made is a resistivity measurement.

Resistivity measurements can be made in several different manners. Regardless of how made, the measurements generally describe the electro-chemical content of the pore space of the formations surrounding the borehole. These measurements can be used to determine, for example, a desired direction of drilling.

In more detail, wellbores or boreholes for producing hydrocarbons (such as oil and gas) are drilled using a drill string that includes a tubing made up of jointed tubulars or a continuous coiled tubing that has a drilling assembly, also referred to as the bottom hole assembly (BHA), attached to its bottom end. The BHA typically includes a number of sensors, formation evaluation tools, and directional drilling tools. A drill bit attached to the BHA is rotated with a drilling motor in the BHA and/or by rotating the drill string to drill the wellbore. An electromagnetic wave propagation logging tool for determining electrical properties of the formations surrounding the borehole is often deployed in the BHA. Such tools are generally referred to in the oil and gas industry as the resistivity logging tools. These tools make measurements of apparent resistivity (or conductivity) of the formation that, properly interpreted, provide information about the petrophysical properties of the formation surrounding the borehole and fluids contained therein. Resistivity logging tools also are commonly used for logging wells after the wells have been drilled. Such tools are typically conveyed into the wells by wireline. The tools that use wireline are generally referred to as the wireline resistivity tools, while the logging tools used during drilling of the wellbore are generally referred to as the logging-while-drilling (LWD) or measurement-while-drilling (MWD) tools. These resistivity logging tools also are referred to as induction logging tools. For the purpose of this disclosure, the term resistivity tool or induction logging tool is meant to include all such and other versions of the resistivity tools.

A typical resistivity tool includes one or more receiver coils or antennas spaced from each other and one or more transmitter coils or antennas. Alternating current is passed through the transmitter coil, which induces alternating electromagnetic fields in the earth formation surrounding the wellbore. Voltages are induced in the receiver coils as a result of electromagnetic induction phenomena related to the alternating electromagnetic fields in the formation.

In order for the measurements to be correct, the timing of the transmitted and received signals may need to be synchronized.

SUMMARY

Disclosed herein is a system for measuring resistivity in a borehole. The apparatus includes first and second modules configured to be conveyed through the borehole, a transmitter connected to the first module, the transmitter transmitting a transmitter signal that causes a field signal to be created in a formation surrounding the borehole, and a receiver connected to the second module configured to sense the field signal. The system also includes a reflection generator, a delay determination circuit that includes a pulse generator and a timer; and a communication link coupling the delay determination circuit and the reflection generator. The delay determination circuit causes a first pulse to be transmitted to the reflection generator and determines an indication that is related to the time until a reflection is received back from the reflection generator. The apparatus may also include a processor to process sensed field signals to generate resistivity related information and/or data based on the indication.

Also disclosed is a method of measuring propagation delay in a resistivity apparatus. The method includes: coupling first and second modules configured to be conveyed through the borehole together, the first module including a transmitter that causes fields to be created in a formation surrounding the borehole and the second module includes a receiver configure to sense the fields and the first module includes a reflection generator; connecting a controller in the transmitter to the receiver with a communication link; sending a first pulse from the receiver to the reflection generator; measuring a time until a reflection is received back from the reflection generator; and determining the propagation delay from the time.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION

Resistivity measurement of the formation in geo-steering applications is often based on electromagnetic wave measurements. This measurement method requires transmitters and receivers to transmit the electromagnetic field and to receive the response from the formation. For some of these measurements synchronization between the transmitters and the receivers is needed. There is technically no problem if both are built in into the same downhole module. For some applications, a transmitter receiver distance, larger than the technology limits for single downhole modules, is needed and this causes the transmitters and receivers be built in into separate, independent downhole modules. In this case the synchronization is affected by the signal propagation delay on the electrical connection between the downhole modules. Herein disclosed are systems and methods that determine this propagation delay, which can be applied to the synchronization signal to correct for the delay.

Figure 1:
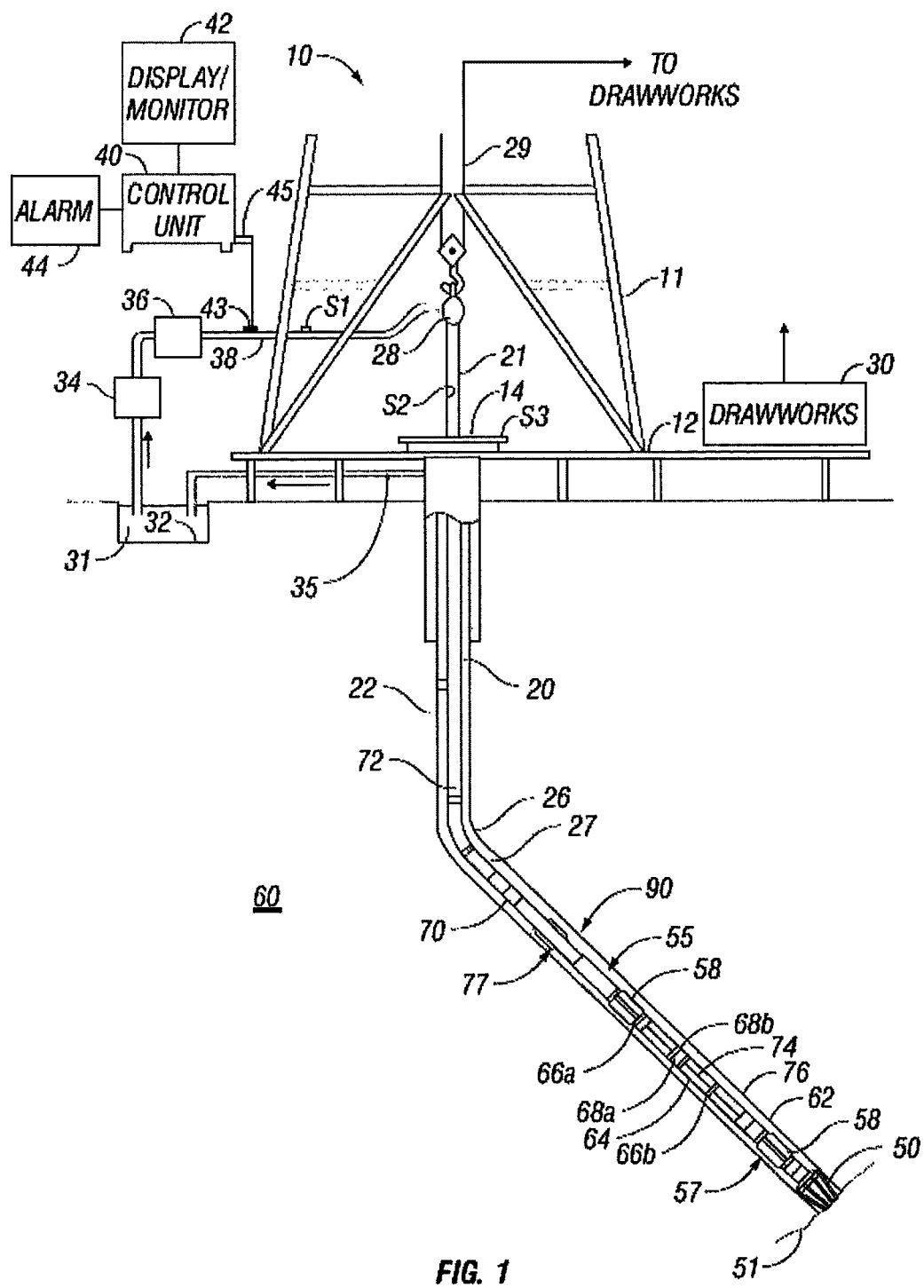
FIG. 1 is an exemplary drilling system and includes a resistivity tool.

FIG. 1 shows a schematic diagram of a drilling system 10 that includes a drill string 20 having a drilling assembly 90, also referred to as a bottomhole assembly (BHA), conveyed in a borehole 26 penetrating an earth formation 60. The drilling system 10 includes a conventional derrick 11 erected on a floor 12 that supports a rotary table 14 that is rotated by a prime mover, such as an electric motor (not shown), at a desired rotational speed. The drill string 20 includes a drilling tubular 22, such as a drill pipe, extending downward from the rotary table 14 into the borehole 26. A drill bit 50, attached to the end of the BHA 90, disintegrates the geological formations when it is rotated to drill the borehole 26. The drill string 20 is coupled to a drawworks 30 via a kelly joint 21, swivel 28 and line 29 through a pulley. During the drilling operations, the drawworks 30 is operated to control the weight on bit, which affects the rate of penetration. The operation of the drawworks 30 is well known in the art and is thus not described in detail herein.

During drilling operations a suitable drilling fluid 31 (also referred to as the "mud") from a source or mud pit 32 is circulated under pressure through the drill string 20 by a mud pump 34. The drilling fluid 31 passes into the drill string 20 via a desurger 36, fluid line 38 and the kelly joint 21. The drilling fluid 31 is discharged at the borehole bottom 51 through an opening in the drill bit 50. The drilling fluid 31 circulates uphole through the annular space 27 between the drill string 20 and the borehole 26 and returns to the mud pit 32 via a return line 35. A sensor S1 in the line 38 provides information about the fluid flow rate. A surface torque sensor S2 and a sensor S3 associated with the drill string 20 respectively provide information about the torque and the rotational speed of the drill string. Additionally, one or more sensors (not shown) associated with line 29 are used to provide the hook load of the drill string 20 and about other desired parameters relating to the drilling of the wellbore 26.

In some applications the drill bit 50 is rotated by only rotating the drill pipe 22. However, in other applications, a drilling motor 55 (mud motor) disposed in the drilling assembly 90 is used to rotate the drill bit 50 and/or to superimpose or supplement the rotation of the drill string 20. In either case, the rate of penetration (ROP) of the drill bit 50 into the borehole 26 for a given formation and a drilling assembly largely depends upon the weight on bit and the drill bit rotational speed. In one aspect of the embodiment of FIG. 1, the mud motor 55 is coupled to the drill bit 50 via a drive shaft (not shown) disposed in a bearing assembly 57. The mud motor 55 rotates the drill bit 50 when the drilling fluid 31 passes through the mud motor 55 under pressure. The bearing assembly 57 supports the radial and axial forces of the drill bit 50, the downthrust of the drilling motor and the reactive upward loading from the applied weight on bit. Stabilizers 58 coupled to the bearing assembly 57 and other suitable locations act as centralizers for the lowermost portion of the mud motor assembly and other such suitable locations.

A surface control unit 40 receives signals from the downhole sensors and devices via a sensor 43 placed in the fluid line 38 as well as from sensors S1, S2, S3, hook load sensors and any other sensors used in the system and processes such signals according to programmed instructions provided to the surface control unit 40. The surface control unit 40 displays desired drilling parameters and other information on a display/monitor 42 for use by an operator at the rig site to control the drilling operations. The surface control unit 40 contains a computer, memory for storing data, computer programs, models and algorithms accessible to a processor in the computer, a recorder, such as any nonvolatile mass storage devices, like e.g. tape, hard disc drives, USB sticks, Solid State Disc or any suitable memory device known as state of the art, unit for recording data and other peripherals. The surface control unit 40 also may include simulation models for use by the computer to processes data according to programmed instructions. The control unit responds to user commands entered through a suitable device, such as a keyboard, computer mouse, joystick or any suitable manual input device known as state of the art. The control unit 40 is adapted to activate alarms 44 when certain unsafe or undesirable operating conditions occur.

Referring back to FIG. 1, drilling assembly 90 also contains other sensors and devices or tools for providing a variety of measurements relating to the formation surrounding the borehole and for drilling the wellbore 26 along a desired path. Such devices may include a device for measuring the formation resistivity near and/or in front of the drill bit, a gamma ray device for measuring the formation gamma ray intensity and devices for determining the inclination, azimuth and position of the drill string. A formation resistivity tool 64, made according an embodiment described herein may be coupled at any suitable location, including above a lower kick-off subassembly 62, for estimating or determining the resistivity of the formation near or in front of the drill bit 50 or at other suitable locations. An inclinometer 74 and a gamma ray device 76 may be suitably placed for respectively determining the inclination of the BHA and the formation gamma ray intensity. Any suitable inclinometer and gamma ray device may be utilized. In addition, an azimuth device (not shown), such as a magnetometer or a gyroscopic device, may be utilized to determine the drill string azimuth. Such devices are known in the art and therefore are not described in detail herein. In the above-described exemplary configuration, the mud motor 55 transfers power to the drill bit 50 via a hollow shaft that also enables the drilling fluid to pass from the mud motor 55 to the drill bit 50. In an alternative embodiment of the drill string 20, the mud motor 55 may be coupled below the resistivity measuring device 64 or at any other suitable place.

Still referring to FIG. 1, other logging-while-drilling (LWD) devices (generally denoted herein by numeral 77), such as devices for measuring formation porosity, permeability, density, rock properties, fluid properties, etc. may be placed at suitable locations in the drilling assembly 90 for providing information useful for evaluating the subsurface formations along borehole 26. Such devices may include, but are not limited to, acoustic tools, nuclear tools, nuclear magnetic resonance tools and formation testing and sampling tools.

The above-noted devices transmit data to a downhole telemetry system 72, which in turn transmits the received data uphole to the surface control unit 40. The downhole telemetry system 72 also receives signals and data from the surface control unit 40 and transmits such received signals and data to the appropriate downhole devices. In one aspect, a mud pulse telemetry system may be used to communicate data between the downhole sensors and devices and the surface equipment during drilling operations. A transducer 43 placed in the mud supply line 38 detects the mud pulses responsive to the data transmitted by the downhole telemetry 72. Transducer 43 generates electrical signals in response to the mud pressure variations and transmits such signals via a conductor 45 to the surface control unit 40. In other aspects, any other suitable telemetry system may be used for two-way data communication between the surface and the BHA 90, including but not limited to, an acoustic telemetry system, an electro-magnetic telemetry system, a wireless telemetry system that may utilize repeaters in the drill string or the wellbore and a wired pipe. The wired pipe may be made up by joining drill pipe sections, wherein each pipe section includes a data communication link that runs along the pipe. The data connection between the pipe sections may be made by any suitable method, including but not limited to, hard electrical or optical connections and induction methods. In case a coiled-tubing is used as the drill pipe 22, the data communication link may be run along a side of the coiled-tubing.

The drilling system described thus far relates to those drilling systems that utilize a drill pipe to conveying the drilling assembly 90 into the borehole 26, wherein the weight on bit is controlled from the surface, typically by controlling the operation of the drawworks. However, a large number of the current drilling systems, especially for drilling highly deviated and horizontal wellbores, utilize coiled-tubing for conveying the drilling assembly downhole. In such application a thruster is sometimes deployed in the drill string to provide the desired force on the drill bit. Also, when coiled-tubing is utilized, the tubing is not rotated by a rotary table but instead it is injected into the wellbore by a suitable injector while the downhole motor, such as mud motor 55, rotates the drill bit 50. For offshore drilling, an offshore rig or a vessel is used to support the drilling equipment, including the drill string.

Still referring to FIG. 1, a resistivity tool 64 made according to the present disclosure may include a plurality of antennas including, for example, transmitters 66a or 66b or and receivers 68a or 68b. In FIG. 1, the transmitters 66 and receivers 68 are illustrated as being part of the same modules 64. It shall be understood, however, that in some instances, the transmitters and receivers may need to be separated by distances that span more than one module.

Figure 2:
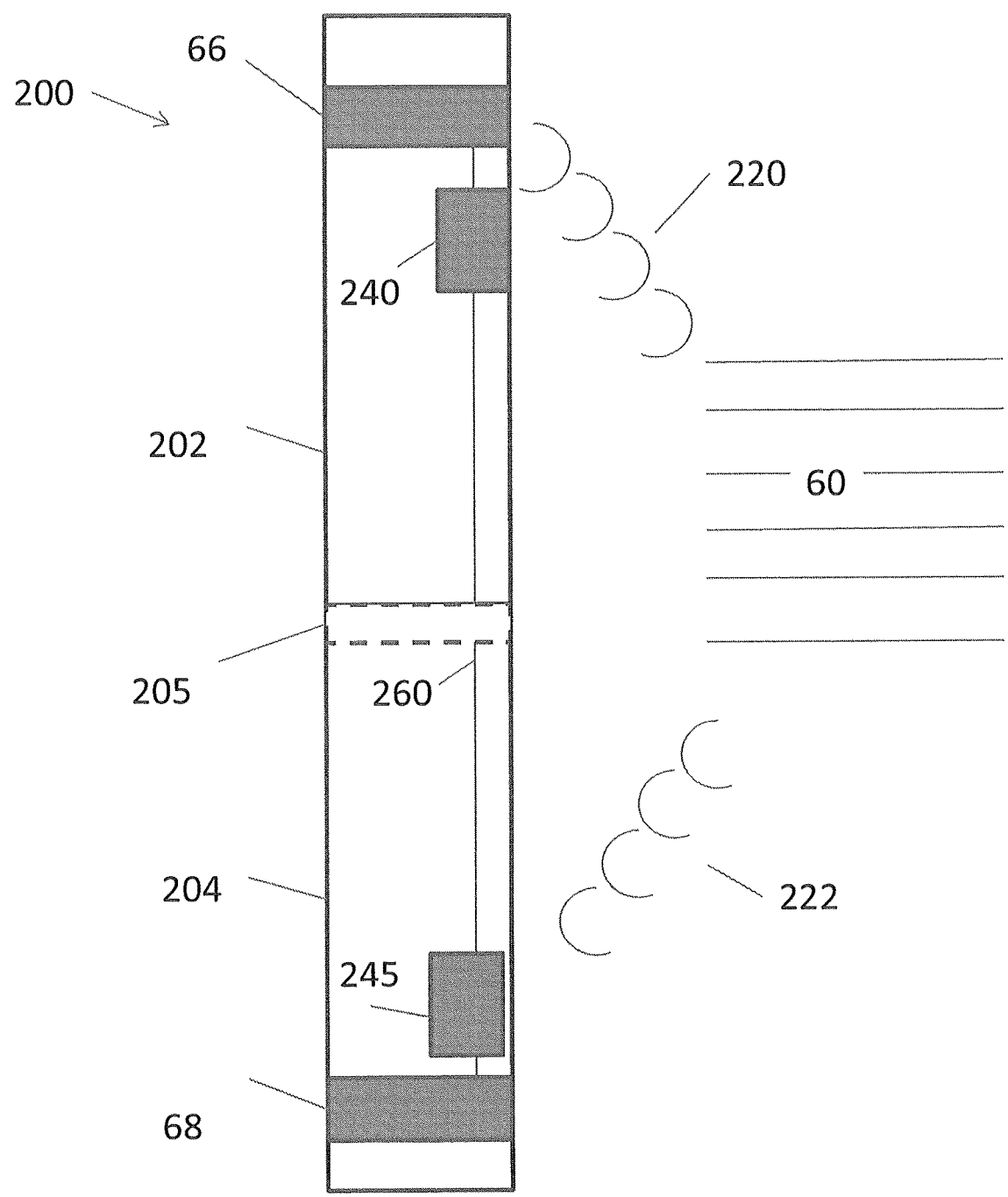
FIG. 2 shows a resistivity tool having transmitters and receivers contained on different downhole modules.

FIG. 2 shows a simplified example of a resistivity measurement apparatus 200 (tool) is shown with transmitter 66 disposed at one end of a first module 202. The module could be a pipe segment or part of a BHA. In this case, second module 204 is included and includes a receiver 68 disposed at an axially distant end of the second module 204. The second module could be a pipe segment or part of a BHA. Between the first and the second modules 202, 204 could be another module 205 (shown in dashes). The exact configuration of the transmitters and receivers is not required and is shown as an example. In general, in operation, alternating current is passed through the transmitter 66 to produce fields 220. These fields induce alternating electromagnetic fields in the earth formation 60 surrounding the wellbore. The induced fields are shown by reference numeral 222. The induced fields cause a voltage at receiver 68 as a result of electromagnetic induction phenomena related to the alternating electromagnetic fields in the formation. In some cases, a controller 240 is controlling the transmitter 66 and may receive information from the receiver 68. The controller 240 may be part of the transmitter 66. Also the receiver 68 may have a controller 245 to control the receiver and to receive information from the transmitter 66. The timing of the signal sent to the formation of (by transmitter 66) and subsequent sensing of signals by receiver 68 can be important in some instances and, as such, may require synchronization between the controllers in the BHA modules. In this case, but not limited to this, the controller 240 in the transmitter 66 and the controller 245 in the receiver 68 may communicate with each other.

In one embodiment, controller 240 (or a processor therein) communicates a signal related to a relative time within the transmitter signal created by the transmitter.

As illustrated, the controller 240 and the controller 245 are connected by communication line 260. This line can be any type of communication line including a twisted pair, a coaxial, triaxial cable, an optical line or any other type of communication link for downhole use. Communication line 260 may comprise of at least two communication line sections that are coupled to each other. Couplers between two communication line sections may be but are not limited to galvanic coupler, capacitive coupler, inductive coupler, or optical coupler. In some cases that communication line 260 may be long enough that a delay is imparted as signals are passed from the controller 245 in the receiver 68 to the controller 240. In addition, delays may be caused by connections, couplers, interfaces or electronic components that are part of the communication line 260 or installed between communication line sections. It should be understood that the teachings herein may be applied to any situation where a delay may be imparted and not just between a controller in a transmitter and a controller in a receiver.

As the delay is increased, the synchronization between elements may be lost. To that end, herein disclosed are systems/methods for determining the delay in a communication line. With the delay known, different elements can be synchronized.

Figure 3:
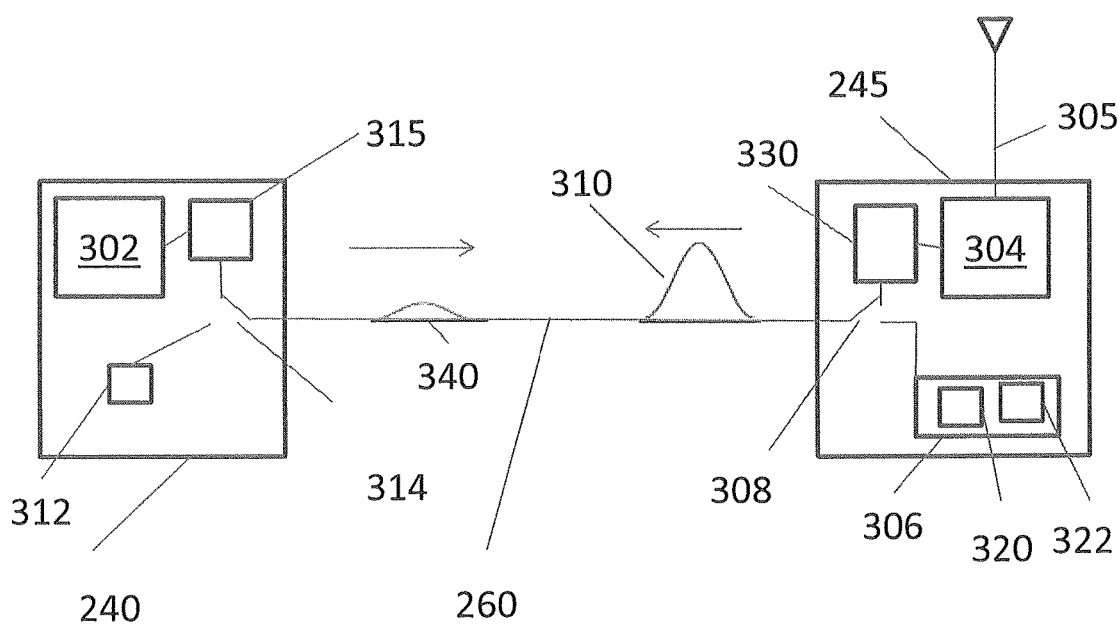
FIG. 3 is simplified block diagram of a synchronization system and is used to detail a method of determining a propagation of communication line.

With reference now to FIG. 3, a communication line 260 connects two circuit modules. As illustrated, the modules are the controller 240 and the controller 245. It shall be understood, however, that the modules are not limited to just these modules and can be any modules in a drilling assembly in one embodiment.

The controller 245 includes receiver main operating logic 304 that allows it to receive signals from an antenna 305. The controller 245 includes a communication unit 330 that allows it to transmit information to and receive information from another BHA module via the transmission line 260. The receiver main operating logic 304 may interpret the signals but that is not required. The received signals, or an interpretation thereof, are transmitted by the receiver main operating logic 304 and the communication unit of the controller 240 or transmitter 66 or another BHA module via communication line 260. The controller 245 also includes a delay determination circuit 306 that determines the delay in the transmission line 260 between the controller 245 and, in the illustrated embodiment, the controller 240.

The controller 240 includes main operating logic 302 that causes the controller 240 to cause a transmitter to transmit signals into a formation. The controller 240 also includes a communication module 315 and a reflection generator 312.

The delay determination circuit 306 includes a pulse generator 320 and a timer 322. The pulse generator 320 generates a first pulse 310 that travels from the controller 245 to the controller 240. That pulse gets reflected back as a reflected pulse 340. The timer 322 measures the time from when the first pulse leaves the controller 245 until the reflected pulse 340 returns to the controller 245. The delay in the line is equal to one half that measured time.

In one embodiment, the determination of the delay is based on a calculated correlation function (Auto correlation) from the sampled data. In another embodiment, a pulse position analysis, such as a peak position determination, a start position determination of the pulse, etc. may be employed As illustrated, a switch 308 couples either the delay determination circuit 306 or the communication module 330 to the transmission line 260. To cause the controller 240 to reflect the pulse, switch 314 couples the line 260 to a reflection generator 312. In one embodiment, the reflection may be generated by simply opening the switch 314. Of course, the reflection generator could include any termination which is different from the (wave) impedance of the line 260 as this will cause a reflection of a first pulse 310. The level of the reflection depends on the difference between the impedance of the line and the impedance of the termination. The maximum of reflection is achieved if the termination is a short (0 resistance) or open (infinite resistance).

Embodiment 1

An apparatus for measuring resistivity in a borehole. The apparatus includes first and second modules configured to be conveyed through the borehole, a transmitter connected to the first module, the transmitter transmitting a transmitter signal that causes a field signal to be created in a formation surrounding the borehole, and a receiver connected to the second module configured to sense the field signal. The system also includes a reflection generator, a delay determination circuit that includes a pulse generator and a timer; and a communication link coupling the delay determination circuit and the reflection generator. The delay determination circuit causes a first pulse to be transmitted to the reflection generator and determines an indication that is related to the time until a reflection is received back from the reflection generator. The apparatus may also include a processor to process sensed field signals to generate resistivity related information and/or based on the indication.

Embodiment 2

The system of embodiment 1, wherein the reflection generator is an open circuit.

Embodiment 3

The system of any prior embodiment wherein the reflection generator is a short circuit.

Embodiment 4

The system of any prior embodiment where delay determination circuit includes a switch that selectively couples the reflection generator to the communication link.

Embodiment 5

The system of any prior embodiment wherein the processor is part of the second module.

Embodiment 6

The system of any prior embodiment wherein the communication link comprises at least two coupled communication line segments.

Embodiment 7

The system of any prior embodiment wherein the communication link is at least one of a wire, a coaxial cable, a twisted pair, a triaxial cable, an optical line and a wire in combination with the tool body as a return.

Embodiment 8

The system of any prior embodiment wherein the indication is determined by applying a correlation analysis between the first pulse and the reflection.

Embodiment 9

The system of any prior embodiment wherein the indication is determined by means of a peak position analysis.

Embodiment 10

The system of any prior embodiment further including a controller operatively coupled to the transmitter, the controller communicating a signal related to a relative time within the transmitter signal created by the transmitter to the processor.

Embodiment 11

A method of measuring propagation delay in a resistivity apparatus. The method includes: coupling first and second modules configured to be conveyed through the borehole together, the first module including a transmitter that causes fields to be created in a formation surrounding the borehole and the second module includes a receiver configure to sense the fields and the first module includes a reflection generator; connecting a controller in the transmitter to the receiver with a communication link; sending a first pulse from the receiver to the reflection generator; measuring a time until a reflection is received back from the reflection generator; and determining the propagation delay from the time.

Embodiment 12

The method of any prior embodiment wherein the reflection generator is an open circuit.

Embodiment 13

The method of any prior embodiment wherein the reflection generator is a short circuit.

Embodiment 14

The method of any prior embodiment, further comprising selectively coupling, by a switch, the reflection generator to the communication link.

Embodiment 15

The method any prior embodiment, wherein the communication link comprises at least two coupled communication line segments.

Embodiment 16

The method of any prior embodiment, wherein the delay determination circuit includes a pulse generator and a timer.

Embodiment 17

The method of any prior embodiment, wherein measuring further includes applying a correlation analysis between the pulse and the reflection.

Embodiment 18

The method of any prior embodiment, wherein measuring further includes applying a peak position analysis

Embodiment 19

The method of any prior embodiment, wherein the communication link is at least one of a wire, a coaxial cable, a twisted pair, a triaxial cable, an optical line, and a wire in combination with the tool body as a return.

Embodiment 20

The method of any prior embodiment, further comprising: communicating, by a controller, a signal related to relative time within the transmitter signal created by the transmitter to the processor.

In support of the teachings herein, various analysis components may be used, including digital and/or analog systems. The digital and/or analog systems may be included, for example, in the downhole electronics unit or the processing unit. The systems may include components such as a processor, analog to digital converter, digital to analog converter, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs, USB flash drives, removable storage devices), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A system for measuring resistivity in a borehole, the system including:
   first and second modules configured to be conveyed through the borehole;
   a transmitter connected to the first module, the transmitter transmitting a transmitter signal that causes a field signal to be created in a formation surrounding the borehole;
   a receiver connected to the second module configured to sense the field signal, a reflection generator;
   a delay determination circuit that includes a pulse generator and a timer; and
   a communication link coupling the delay determination circuit and the reflection generator;
   wherein the delay determination circuit causes a pulse to be transmitted to the reflection generator and determines an indication that is related to the time until a reflection is received back from the reflection generator; and
   a processor to process the sensed field signal to generate resistivity related information based on the indication.

2. The system of claim 1, wherein the reflection generator is an open circuit.

3. The system of claim 1, wherein the reflection generator is a short circuit.

4. The system of claim 1, further comprising a switch that selectively couples the reflection generator to the communication link.

5. The system of claim 1, wherein the processor is part of the second module.

6. The system of claim 1, wherein the communication link comprises at least two coupled communication line segments.

7. The system of claim 1, wherein the communication link is at least one of a wire, a coaxial cable, a twisted pair, a triaxial cable, an optical line and a wire in combination with the tool body as a return.

8. The system of claim 1, wherein the indication is determined by applying a correlation analysis between the pulse and the reflection.

9. The system of claim 1, wherein the indication is determined by means of a peak position analysis.

10. The system of claim 1, further comprising:
a controller operatively coupled to the transmitter, the controller communicating a signal related to a relative time within the transmitter signal created by the transmitter to the processor.

11. A method of measuring propagation delay in a resistivity apparatus, the method comprising:
coupling a first and a second module configured to be conveyed through the borehole, the first module including a transmitter transmitting a transmitter signal that causes field signal to be created in a formation surrounding the borehole and the second module including a receiver configured to sense the field signal;
connecting a communication link to the first module and the second module;
connecting a reflection generator and a delay determination circuit to the communication link;
sending a pulse from the delay determination circuit to the reflection generator;
measuring an indication that is related to the time until a reflection is received back from the reflection generator; and
processing the sensed field signal to generate resistivity in the formation surrounding the borehole related data based on the indication.

12. The method of claim 11, wherein the reflection generator is an open circuit.

13. The method of claim 11, wherein the reflection generator is a short circuit.

14. The method of claim 11, further comprising selectively coupling, by a switch, the reflection generator to the communication link.

15. The method, of claim 11, wherein the communication link comprises at least two coupled communication line segments.

16. The method of claim 11, wherein the delay determination circuit includes a pulse generator and a timer.

17. The method of claim 11, wherein measuring further includes applying a correlation analysis between the pulse and the reflection.

18. The method of claim 11, wherein measuring further includes applying a peak position analysis.

19. The method of claim 11, wherein the communication link is at least one of a wire, a coaxial cable, a twisted pair, a triaxial cable, an optical line, and a wire in combination with the tool body as a return.

20. The method of claim 11, further comprising:
communicating, by a controller, a signal related to relative time within the transmitter signal created by the transmitter to the processor.

* * * * *